Patented Mar. 14, 1950

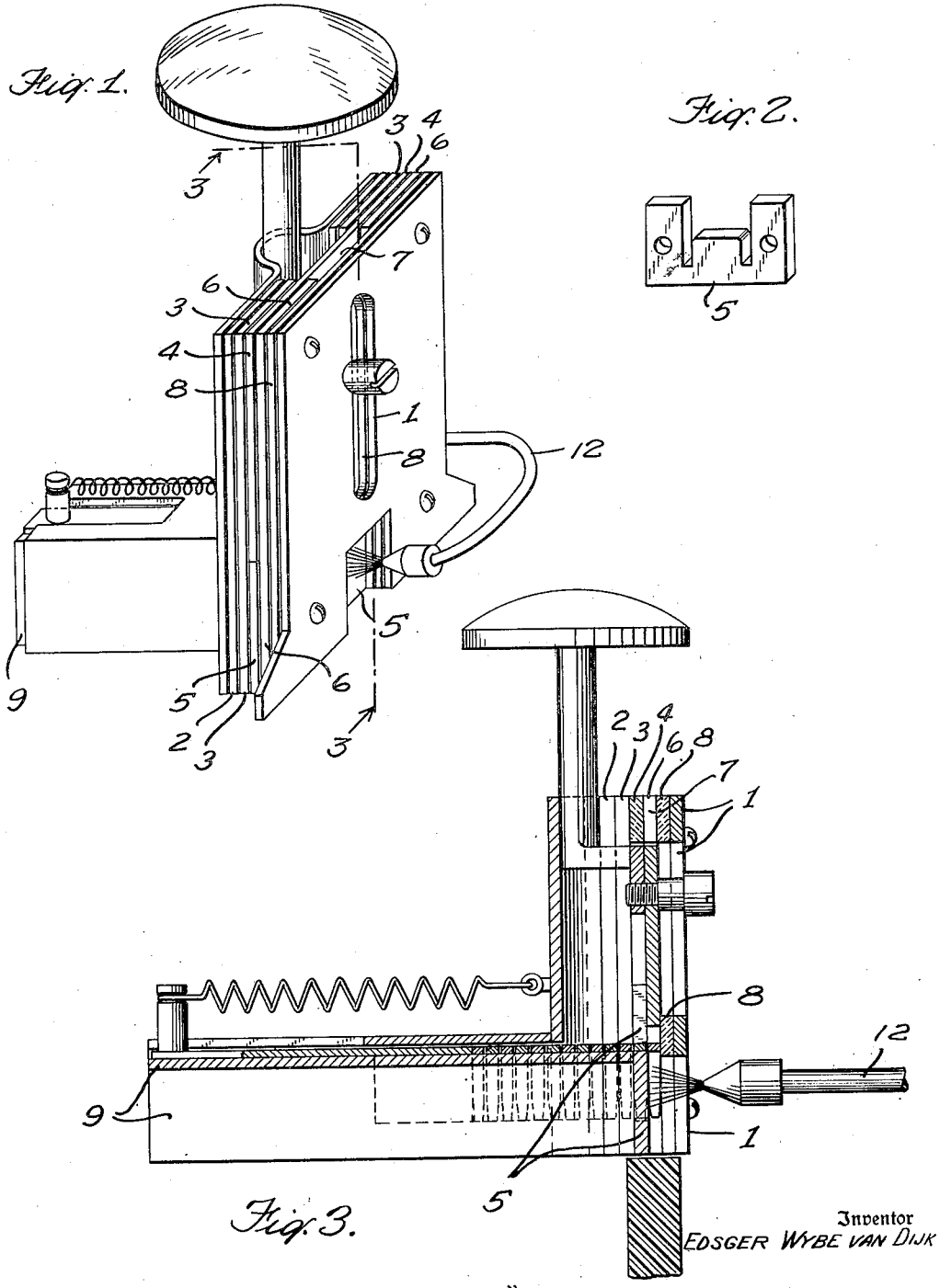

2,500,721

UNITED STATES PATENT OFFICE 2,500,721

STAPLING MACHINE

Edsger Wybe van Dijk, Rotterdam, Netherlands, assignor to Ewald Rudolf Timmerbeil, Arnhem, Netherlands Application February 14, 1947, Serial No. 728,522
In the Netherlands February 13, 1946

Section 1, Public Law 690, August 8, 1946
Patent expires February 13, 1966

3 Claims. (Cl. 1—49)

This invention relates to a stapling machine in which staples are heated prior to being driven into the work.

It is known to press heated metal bodies into thermoplastic materials for different purposes, as the pressing of metal eyelets into thermoplastic buttons, the pressing of hooks and clasps into haircombs and other articles.

According to the invention heated metal bodies are used to connect two or more thermoplastic parts. Up to now separate parts of thermoplastic material were joined by cementing or heating. The latter method may be carried out by heating the parts entirely or by heating only adjacent portions. The process according to the invention offers great advantages with respect to the above mentioned processes. A safer and quicker connection is obtained as compared with glueing or heating while in the case of opaque materials the metal bodies may be placed out of sight by pressing them a little under the surface and putting thereover some lacquer of the desired colour.

A very good application of the invention is the repairing of broken and cracked gramophone records. The great advantage over glueing is that no glue enters between the separate parts, while the metal bodies help to provide an effective resistance against the tensions in the record which tend to separate the parts. The metal bodies are pressed into the flat inner and outer edges. It has been found that even with great sound amplification practically no annoying tick is heard when the needle passes from one part to the other.

Tubes of thermoplastic material may also be repaired advantageously with the aid of the process according to the invention. This can be done, ordinarily, only with great difficulty by glueing but such a joint is not sufficiently strong to withstand pressure, as is the case with the articles joined in accordance with the present method.

Articles composed of separate parts may be built up simply and quickly according to the invention. In many cases this way of manufacturing will be simpler than the known way of heating the different parts or their adjoining portions.

By preference according to the invention conventional type of staples are used as metal bodies to be pressed into the thermoplastic materials. The present process is then executed with the aid of a conventional stapling device, in which means are provided for the heating of the staples between the staple-supply and the place where they are pressed out of the device.

The heating means may preferably consist of a heated insulated metal plate along which the staples are guided during the descent of the staple-driver.

In the drawings, an apparatus according to the invention is shown by way of example.

Fig. 1 is a perspective view of a device for carrying out the invention.

Fig. 2 is a view of the metal guide plate 5 of Fig. 1.

Fig. 3 is a cross section of the device taken on line 3—3 of Fig. 1.

In contrast to the conventional stapling device where the plate 1 is screwed directly to wall 2, there are provided in this case insulating strips 3 intermediate the plate 1 and the wall 2, screwed to the latter. In addition to the strips 3 there is also provided an insulating plate 4, the function of which is to act as a guide for the staple-driver. In line with the movement of the staple-driver there is also positioned a metal plate 5 which has smooth surfaces so as not to impede the downward movement of the staple-driver. Ahead of plates 4 and 5 there are placed two filler strips 6 which form a groove 7 through which the staple-driver may move up and down and in which the staple which is being engaged by the driver receives a downward motion. A further plate 8 serves to delimit the groove 7 and to thermally insulate the staple from the front plate 1. The source of heat in the form of a gas supply pipe 12 is preferably positioned so as to direct a flame onto a staple positioned against the plate 5.

The operation of the device is as follows:

The staples, in the conventional manner, are disposed on a staple rack 9 in the form of a block and are being pulled forward by means of a spring secured to a rigid part of the device. Before actuation of the staple-driver, the first staple in line of the moving driver comes to rest against the insulating plate 8 within the groove 7 ready to be acted on by the staple-driver. As the staple is being depressed within the groove, it comes to rest in such a position as to be in the line of the gas burner flame. Upon being heated the staple will be moved down further along the plate 5 which has in the meantime also acquired a high temperature which serves to maintain the staple at a sufficiently high degree of heat. Further descent of the staple will effect a pressing thereof into the thermoplastic material arranged in the line of movement of the staple. As the staple-driver moves back into its rest position, the staple driving spring will push the staple block ahead and bring the next staple in line for application.

While the above description has been made in connection with commercially available stapling devices, it is well-understood that the scope of the invention is not to be limited to the embodiment as described but rather to the scope as expressed in the appended claims.

I claim:

1. A stapling device for manually inserting staples in thermoplastic materials comprising in combination driving means adapted to act on a staple to move same; guide means for said driving means; heating means for raising the temperature of each staple; a plate shaped to receive a staple and hold same, said plate being in the zone of heating of said heating means to maintain it and a staple carried thereby at an elevated temperature; guiding means for each staple to locate same under urge of said advancing means on said heated plate; said heating means heating a staple as it is moved toward and into contact with said plate, and insulating means associated with said plate to keep said driving means and guiding means at a temperature low enough for manual manipulation of said driving means when it is desired to drive a heated staple into thermoplastic materials.

2. A stapling device for manually inserting staples in thermoplastic materials comprising in combination driving means adapted to act on a staple to move same; heating means for raising the temperature of each staple; a plate shaped to receive a staple and hold same, said plate being in the zone of heating of said heating means to maintain it and a staple carried thereby at an elevated temperature; guiding means for each staple to locate same on said heated plate; said heating means heating a staple as it is moved into contact with said plate; and insulating means associated with said plate to keep said driving means at a temperature low enough for manual manipulation of said driving means when it is desired to drive a heated staple into thermoplastic materials.

3. A stapling device for manually inserting staples in thermoplastic materials comprising in combination driving means adapted to act on a staple to move same; heating means for raising the temperature of each staple; a plate shaped to receive a staple and hold same, said plate being in the zone of heating of said heating means to maintain it and a staple carried thereby at an elevated temperature; guiding means for each staple to locate same on said heated plate; said heating means heating a staple as it is moved into contact with said plate; and insulating means associated with said plate to keep said driving means at a temperature low enough for manual manipulation of said driving means when it is desired to drive a heated staple into thermoplastic materials; said heating means comprising a combustible gas jet playing upon said plate and a staple seated thereon to raise same to desired temperature for penetration into the thermoplastic material when said driving means is manually operated to drive said heated staple.

EDSGER WYBE van DIJK.

REFERENCES CITED

The following references are of record in the file of this patent:

UNITED STATES PATENTS

| Number | Name | Date |
|---|---|---|
| 757,496 | Reed | Apr. 19, 1904 |
| 1,248,593 | Arnold | Dec. 4, 1917 |
| 1,391,048 | Dobyne | Sept. 20, 1921 |
| 2,063,345 | Scott | Dec. 8, 1936 |

FOREIGN PATENTS

| Number | Country | Date |
|---|---|---|
| 561,386 | France | June 2, 1896 |